United States Patent

Oudet

[11] Patent Number: 5,942,832
[45] Date of Patent: Aug. 24, 1999

[54] ELECTROMAGNETIC DRIVING DEVICE WITH A MOVABLE PERMANENT MAGNET

[75] Inventor: Claude Oudet, Besançon, France

[73] Assignee: MMT S.A., Fribourg, Switzerland

[21] Appl. No.: 09/094,532

[22] Filed: Jun. 12, 1998

[30] Foreign Application Priority Data

Jun. 13, 1997 [FR] France .................................. 97 07335

[51] Int. Cl.⁶ .................................................. H02K 1/22
[52] U.S. Cl. ........................ 310/254; 310/156; 310/268
[58] Field of Search ................................... 310/268, 254, 310/156; 335/220, 225, 272

[56] References Cited

U.S. PATENT DOCUMENTS

| | | | |
|---|---|---|---|
| 4,283,644 | 8/1981 | Kondo et al. ........................ | 310/68 R |
| 4,910,422 | 3/1990 | Brinkmann et al. ...................... | 310/77 |
| 5,053,667 | 10/1991 | Oudet ..................................... | 310/268 |
| 5,298,825 | 3/1994 | Oudet et al. ............................. | 310/156 |
| 5,334,893 | 8/1994 | Oudet et al. ............................. | 310/38 |
| 5,512,871 | 4/1996 | Oudet et al. ............................. | 335/220 |

FOREIGN PATENT DOCUMENTS

| | | | |
|---|---|---|---|
| 0 310 223 A1 | 4/1989 | European Pat. Off. .......... | H01F 1/10 |
| 0 364 026 A1 | 4/1990 | European Pat. Off. ....... | H02K 33/16 |

*Primary Examiner*—Thomas M. Dougherty
*Assistant Examiner*—B. Mullins
*Attorney, Agent, or Firm*—Clifford W. Browning; Woodard, Emhardt, Naughton Moriarty & McNett Patent and Trademark Attorneys

[57] ABSTRACT

A movable member of the present driving device comprises a magnetized part, or more than one magnetized parts having all the same direction of magnetization, which is perpendicular to the direction of movement. Each magnetized part is moving in at least two air-gaps of a closed magnetic circuit coupled with en energizing coil. The material of the magnetized parts has a linear demagnetization characteristic up to temperatures at least equal to 100° C. and at least up to a negative value of the flux density equal, in absolute value, to 0.5 times the remanence of the magnetic material. The driving device is dimensioned so that the mean operating point of each magnetized part lies at a flux density value smaller than 0.5 times the value of the remanence of the magnetic material used. The volume of magnetic material can be substantially reduced for a given force or torque to be delivered.

7 Claims, 3 Drawing Sheets

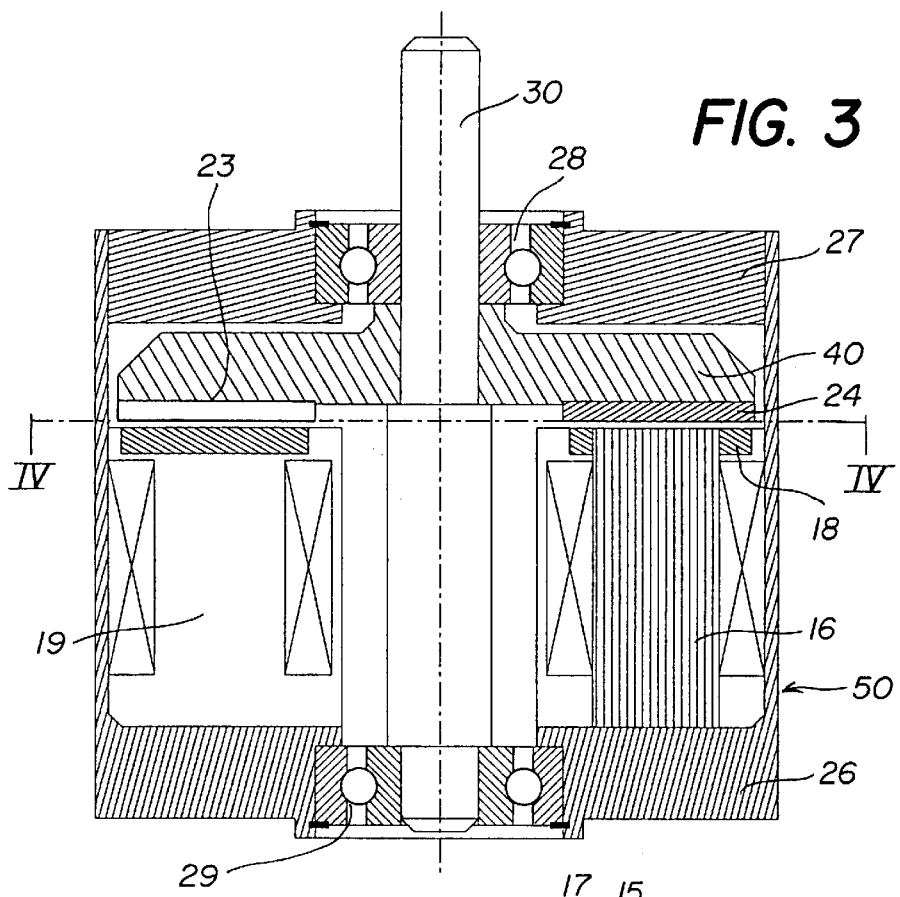
FIG. 3
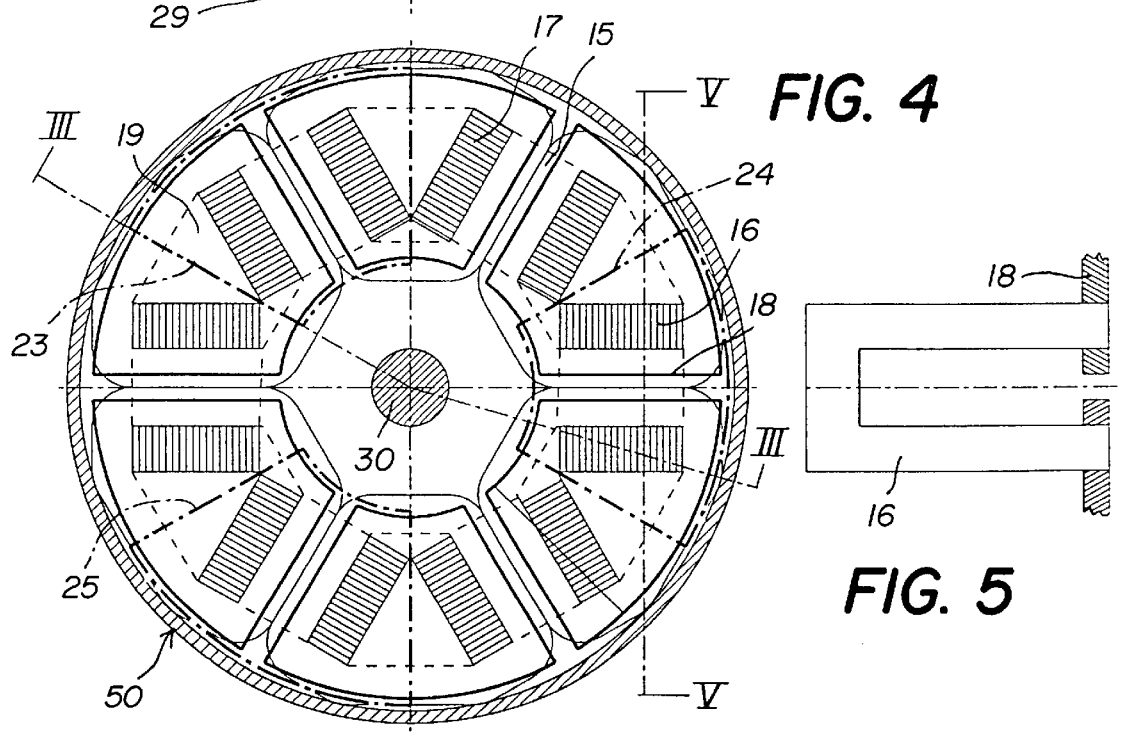
FIG. 4
FIG. 5

ELECTROMAGNETIC DRIVING DEVICE WITH A MOVABLE PERMANENT MAGNET

The present invention relates to an electromagnetic driving device comprising a stator structure and a movable member including one or more parts magnetized perpendicularly to the direction of their movement, said magnetized part or parts being made from a material having a reversible permeability close to that of the air and having in the entire operating range a practically straight demagnetization characteristic and a straight recoil line practically coincident with this characteristic, said stator structure comprising at least a first magnetic circuit part made of a material of high magnetic permeability, said circuit part or parts having each two polar parts, said stator structure further comprising at least one electric energizing coil coupled with a first magnetic circuit part, the movable member or the stator structure comprising at least a second magnetic circuit part made of a material of high magnetic permeability and arranged so as to form with each of said polar parts an air-gap, all these air-gaps having the same substantially constant length measured perpendicularly to the faces of the polar parts, said first and second circuit parts forming together one or more closed magnetic circuits, the driving device being arranged so that the magnetized part or parts can move through said air-gaps, these magnetized parts having each a substantially constant length measured in the direction of magnetization, which length is shorter than the length of each air-gap by the mechanical clearance necessary to allow the movement of the movable member through said air-gaps, each magnetized part of the movable member having a width which does not exceed the sum of the width of a polar part and of the width of the space between the two polar parts of a same magnetic circuit, all these widths being measured in the direction of said movement.

BACKGROUND OF THE INVENTION

Driving devices of this type, which can be rotary or linear devices, make it possible, in particular, to provide along a relatively long path of the movable member a torque or a force which is constant for a given value of the ampere-turns of the energizing coil, this torque or this force being proportional to the ampere-turns. Such devices can thus be used advantageously as directly controlling actuators, which are more reliable than those formed by d.c. motors with reduction gears. They can also be used for example as polyphase rotary motors providing, when fed with constant current, a trapezoidal torque characteristic in each phase.

An inconvenience of these known devices resides in the cost of the high energy magnetic materials, such as generally necessary for achieving the required performances, in particular regarding the force or the torque to be delivered.

Another inconvenience of the known devices is the fact that in order to reach sufficient forces or torques, the movable member is provided with elementary permanent magnets of alternating polarities and therefore requires a magnetization prior to the assembly of the device and manipulations which are critical in view of the energy and the fragility of the magnets being used. Therefore, and in particular in large series manufacturing, the risk cannot be entirely excluded that a magnet particle remains inside the device and lodges in the air-gap of a magnetic circuit, thereby causing a defect of the device.

BRIEF SUMMARY OF THE INVENTION

A first object of the invention is to avoid the above mentioned inconveniences while providing an actuating device the performances of which are similar to those of the existing devices.

To this effect, in the electromagnetic driving device according to the invention, in case the movable member includes more than one magnetized part, all magnetized parts of the movable member are magnetized in the same direction, the material of the magnetized part or parts has a practically linear demagnetization characteristic up to temperatures at least equal to 100° C. and at least up to a negative value of the flux density substantially equal, in absolute value, to 0.5 times the remanence of said material, and the magnetic circuit or circuits and the magnetized part or parts are dimensioned so that the mean operating point of each magnetized part, in the absence of current in the coil or coils, lies at a flux density value smaller than 0.5 times the value of the remanence of said magnetic material.

The use of a movable member the magnetized parts of which are all magnetized in the same direction, means a reduction by half of the volume of magnetized parts as compared to the usual case where magnetized parts of alternating polarities are arranged in said air-gaps, all dimensions being the same, since the number of these unidirectionally magnetized parts is then only half the number of air-gaps. The reduction of the magnet volume and thus of the cost of the material used also corresponds to a reduction of the mass of the movable member, which is an important advantage in particular when high accelerations are required. Such a structure of the movable member further makes it possible to effect the magnetization after the assembly of the device.

The reduction of the magnet volume however also leads to a corresponding reduction of the force or the torque delivered at a given number of ampere-turns if the other parameters of the device remain the same.

To counterbalance the loss of force or torque, at least for a great part, the invention uses an appropriate magnet material in an hitherto unknown manner so as to make it possible to substantially increase the ampere-turns which can be applied and to provide a great variation of the flux density.

In driving devices of the type considered here, the variation of the operating point of the movable magnet on the demagnetization characteristic B(H) is limited, on the one hand, by the maximum flux density which is acceptable to avoid saturation of the material of which the magnetic circuit is made, or to avoid a substantial reduction of the permeability thereof and, on the other hand, by the minimum negative value of the magnetic field for avoiding the risk of a demagnetization of the magnet.

The development of magnetic materials of high energy, in the aim of increasing the intrinsic coercivity of the magnets at room temperature, has in particular led to NdFeB-type magnets having B(H) characteristics in which a knee occurs in the second quadrant only at very high temperatures, for example at temperatures exceeding 215° C. When working at lower temperatures, the linear portion of the demagnetization characteristic appears to extend into the third quadrant, in particular up to negative values of the flux density which exceed, in absolute value, 0.5 times the remanence of the material at temperatures at least equal to 100° C.

In such a case, by using an arrangement according to the invention, by which the mean operating point of the magnet lies at a value of the flux density of less than half the remanence, it becomes possible to work in a hitherto never considered range of variation of the flux density, which range is very large. With a device according to the invention, forces or torques can be obtained which are at least comparable to those of the usual devices while the latter need a quite larger magnet volume.

According to a specific embodiment, the present driving device can comprise a rotary movable member mounted on an axis which is lodged in the stator structure, this movable member having a limited stroke and comprising a magnetized part, the shape of which is substantially that of a portion of a flat annular disc and which is arranged in a plane perpendicular to the axis of rotation of the movable member, said stator structure comprising at least one magnetic circuit part which is in the shape of a U the ends of which form polar parts. In such an embodiment, the device according to the invention is advantageously characterized in that said polar parts have two respective edges opposite each other which are parallel to each other and parallel to an axial plane, the magnetized part having, in the direction of rotation, two end portions the edges of which substantially coincide, in the end positions of the movable member, with the respective edges of said polar parts.

According to another embodiment, the present driving device can comprise a rotary movable member which is mounted on an axis lodged in the stator structure, this movable member comprising at least one magnetized part the shape of which is substantially that of a portion of a flat annular disc and which is arranged in a plane perpendicular to the axis of rotation of the movable member, said stator structure comprising at least two U-shaped magnetic circuit parts arranged at one side of the plane of the magnetized part. In such an embodiment, the device according to the invention is advantageously characterized in that two neighbouring legs of said two U-shaped circuit parts are coupled with a same electric energizing coil, the ends of these neighbouring legs being joined by a common polar part. Said U-shaped parts are preferably formed of U-shaped sheet stacks.

The invention also aims at a method of using the present driving device according to which a biasing permanent current is applied to said coil or coils so as to adjust the mean operating point of the magnetized part or parts at a value of the flux density at least approximately equal to zero. In such a case, the force or the torque corresponding to the biasing ampere-turns can be compensated, for example by a spring.

An adjustment by which the mean flux density is approximately equal to zero is particularly useful in the case of linear or angular actuators which are to operate at high frequencies. Generally speaking, the reduction of the mean flux density as provided for by the invention makes it possible, in particular, to reduce the parasitic mechanical stress and magnetic losses. In the case of rotary driving devices with an axially extending air-gap, for example, where the axial forces vary with the square of the flux density, the friction and the wear of the bearings are substantially reduced. In arrangements where the magnetized parts are mounted on a movable yoke and are therefore strongly attracted by the polar parts of the stator, so that the axial stop is subject to an important stress, the reduction of the mean flux density is particularly advantageous.

The invention further relates to a method of manufacturing the present device according to which the movable member is assembled in a non-magnetized state with said stator structure and the magnetization of the corresponding parts of the movable member is then effected by placing the assembled device in an inductor. In order to obtain more easily a saturation of the magnetized parts, it can be advantageous, when magnetizing, to raise the temperature to a value comprised between 100 and 150° C.

BRIEF DESCRIPTION OF THE SEVERAL VIEWS OF THE DRAWINGS

Further characteristics, advantages and aims of the invention will become apparent from the description given hereunder, by way of example, of different embodiments of actuating devices shown in the attached drawings, in which:

FIG. 3 is a sectional view along line III—III of FIG. 4 of an actuator with limited stroke comprising three magnetized parts;

FIG. 4 is a plane view along line IV—IV of FIG. 3; and

FIG. 5 is a partial sectional view along line V—V of FIG. 4.

DETAILED DESCRIPTION OF THE INVENTION

Figure 1:
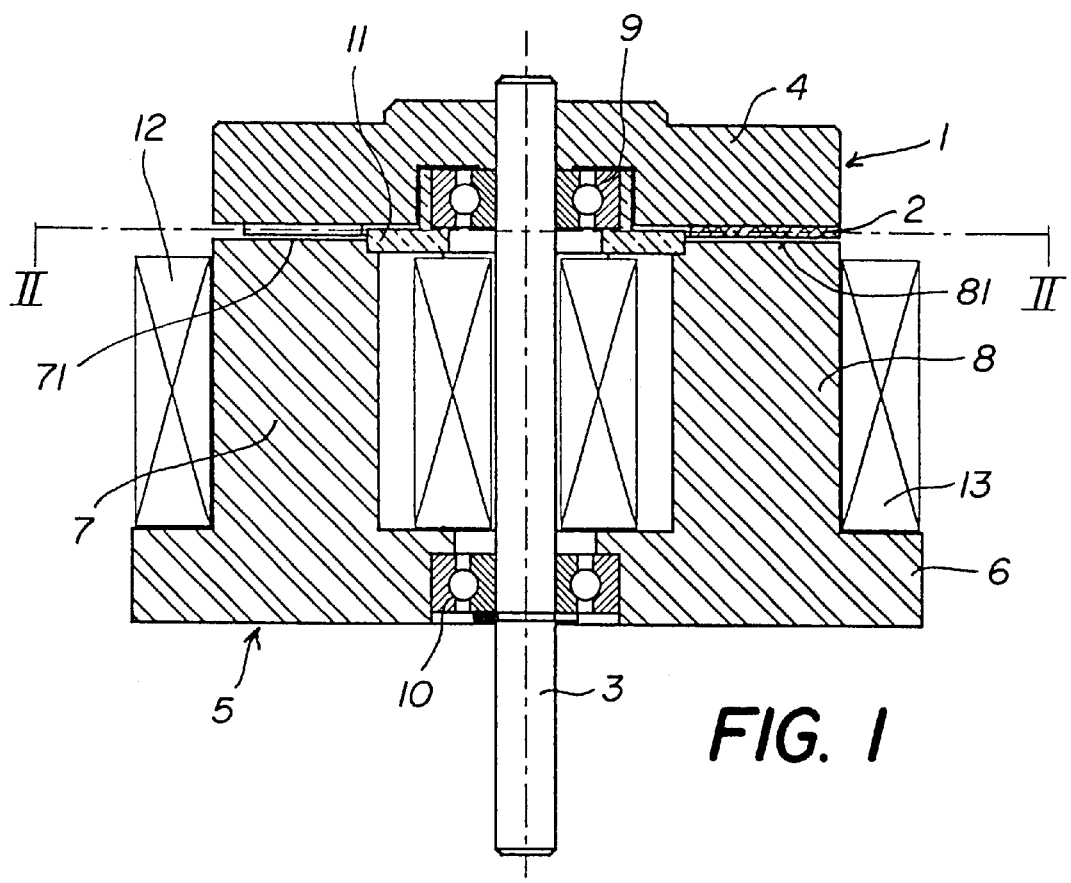
FIG. 1 is a sectional view along line I—I of FIG. 2 of a rotary actuator with limited stroke comprising a single magnetized part.
Figure 2:
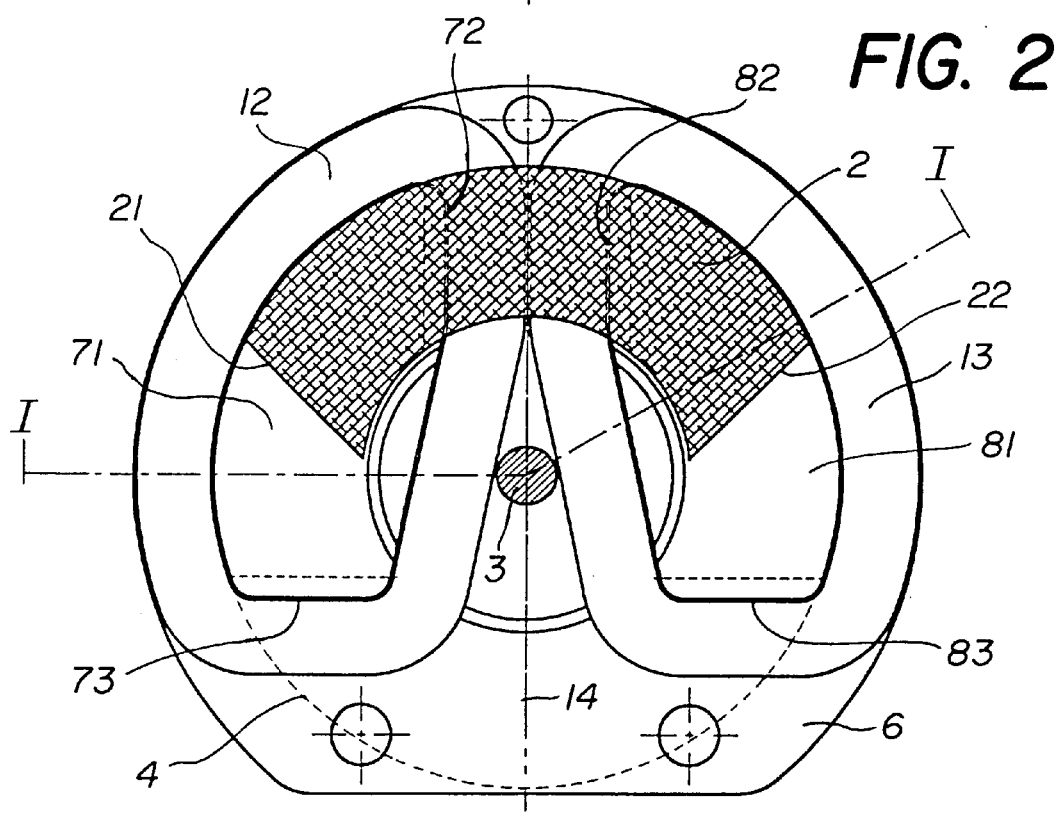
FIG. 2 is a plane view along line II—II of FIG. 1.

FIGS. 1 and 2 show a driving device according to the invention in the form of a rotary actuator with limited stroke comprising a single magnetized part. In this example, a movable member 1 bears a magnetized part 2 having the shape of a portion of a plane annular disc of small thickness with respect to its other dimensions, this part 2 being magnetized parallelly to the axis of rotation 3 of the driving device.

The movable member 1 comprises a yoke 4 made from a material of high magnetic permeability, for example from sintered soft iron, the magnetized part 2 being glued onto the plane surface of this yoke. The assembled rotary member 1 is mounted on the axis 3 by pressing.

The stator of this actuating device comprises a stationary magnetic circuit part 5 having a base portion 6 and two core portions 7 and 8, the free ends of which constitute respective polar parts 71 and 81. These polar parts form with the yoke 4 two respective air-gaps of a same constant length, measured perpendicularly to the faces of these polar parts. The length of the magnetized part 2, measured in the same direction, is slightly smaller than the length of these air-gaps, the difference between the air-gap length and the length of the magnetized part corresponding to the necessary mechanical clearance for the movement of the movable member with respect to the stator.

The stator further comprises two bearings 9 and 10 for the axis 3, these bearings being fixed directly, or through a mounting part 11, to the part 5 as shown in FIG. 1.

Two electric coils 12 and 13 are placed, respectively, around the core portions 7 and 8, the direction of winding and the direction of the energizing current which flows in the coils being chosen so that opposite polarities appear on the polar parts 71 and 81. The interaction of the magnetic poles thus created with the magnetized part provides the torque of the actuator in one or the other direction of rotation, depending on the direction of the current. The stroke of the movable member is limited by conventional means not represented, so that it extends in the present device over a maximum angle of 90°.

The shape of the coils 12 and 13 and the shape of the magnetized part 2 which are an important characteristic of the present device, are shown in FIG. 2. This figure represents the magnetized part in an intermediary position, namely at half stroke between the end positions of the magnetized part. It will be seen in particular that the opposite edges 72 and 82 of the respective polar parts 71 and 81 are parallel to each other and parallel to the plane of axial symmetry 14 in the area of passage of the magnetized part 2. The magnetized part itself has edges 21 and 22 which are inclined with respect to the radial direction so that in the end positions of the movable member, these edges coincide with or are very close to the edges 72 and 82, respectively. The edges of the other ends of the magnetized part then coincide with or are very close too the edges 83 and 73 of the respective polar parts 91 and 71. The thus defined arrangement makes it possible to reduce the surface, and consequently the volume of the magnetized part, to a minimum in such a structure, while all other parameters remain the same.

The yoke 4 which closes the magnetic circuit of this device and the width of which, in the direction of the movement, must be at least equal to the width of the magnetized part increased on each side thereof by the width of a polar part of the stator—which corresponds in the present case to an arc slightly less than $2\pi$ times the mean radius of the magnetized part—so that the yoke 4 has here a circular shape as indicated, partly by a dashed line, in FIG. 2.

By way of example, using a magnetized part with a length as defined above of 1 mm and a clearance of 0.4 mm between the magnetized part and a polar part of the stator, and using a magnet material suitable in relation with the present invention, for example a material having a remanence of 0.85 T at a temperature of about 140° C., the mean operating point of the magnetized part lies at a value of the flux density of 0.3 T. Using 1300 ampere-turns in each coil, the variation of the operating point from one end position of the movable member to the other, in which end positions the magnetized part is in its entirety facing the corresponding polar part, is ±1.17 T. In this case, the extreme values of the flux density are, respectively, slightly higher than the value corresponding to the knee of the B(H) characteristic of the magnet material and slightly smaller than the maximum flux density acceptable for a non-expensive sintered iron material.

It is to be noted that the potential applied to the closed circuit comprising the two air-gaps in series is 2600 ampere-turns, which is four times the potential of the sole magnetized part included in this circuit in an extreme position of the movable member, which potential is equal to about 650 ampere-turns. Such a disproportionate dimensioning is absolutely unusual in the field of actuators with movable permanent magnet. For comparison, in known devices using two adjacent magnetized parts of oposite direction of magnetization, the mean operating point corresponds to a flux density of 0.6 T and the maximum ampere-turns which would be acceptable are 970 ampere-turns per air-gap. The ratio of the above mentioned potentials becomes in this case equal to about 1.5 in place of 4 in a device according to the invention. The torque of the mentioned usual device would be 50% greater, but the mass of the magnet material is about three times that of the device of the invention. The solution according to the invention is thus substantially less expensive in addition to the fact that it makes it possible to magnetize the movable part in the assembled state of the device and provides other advantages as already mentioned above.

FIGS. 3 to 5 show another embodiment of a driving device according to the invention. This is also a rotary actuator, for example also with limited stroke, the movable member of which comprises three magnetized parts 23, 24, 25 magnetized in the same direction parallelly to the axis of rotation. These magnetized parts have here the shape of annular sectors and, as in the preceding example, they are fixed, for example by gluing, on a yoke 40 closing the magnetic circuits, the first parts of these magnetic circuits being formed in the stator structure 50.

Figure 6:
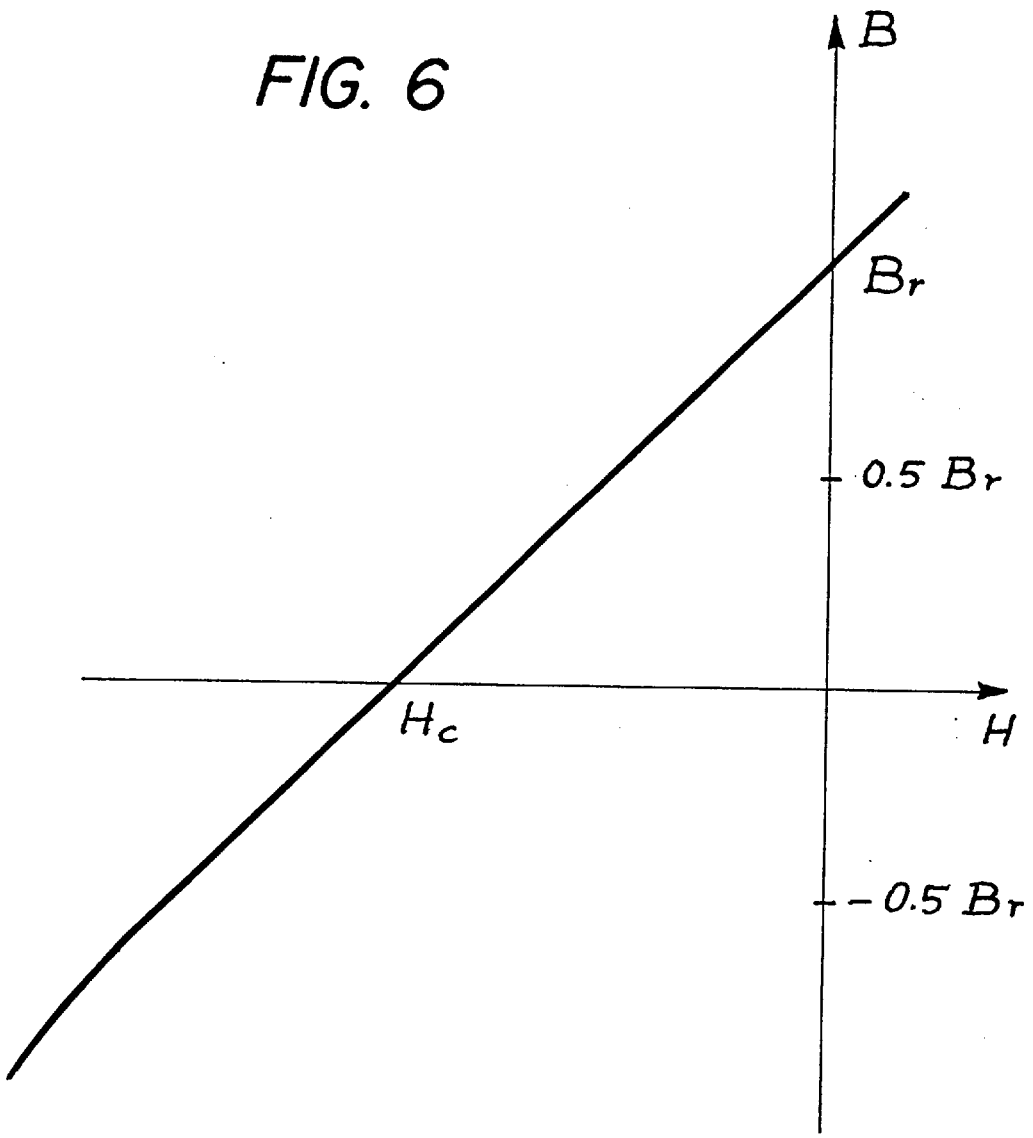
FIG. 6 is a graph depicting the demagnetization characteristic of the magnetized part or parts of FIGS. 1 or 3.

In the embodiment according to FIGS. 3 to 5, the arrangement of the magnetic circuit parts of the stator structure and their coupling with the energizing coils represent an original feature. As can be seen in particular in FIGS. 4 and 6, each coil, such as the coil 15, is coupled with two U-shaped magnetic circuit parts, such as 16 and 17. The coil 15 actually encloses two neighbouring legs of these circuits which can advantageously be made in the form of U-shaped stacks of sheet metal. In the present example, six coils are coupled in such a way with six magnetic circuit parts arranged according to the view from above of FIG. 4. The ends of the legs surrounded by a same coil are joined together by a respective polar part, such as the polar part 18.

Since devices according to the present invention do not require great cross-sectional areas of the magnetic circuits, the structure according to FIGS. 3 to 5 represents a very advantageous solution, in particular from the point of view of the cost price and the ease of manufacture. The space between the magnetic circuit legs which are surrounded by a same coil, such as the space 19, can be filled with resin and the whole device can be lodged in a casing 26, 27 of magnetic or non-magnetic material, such a casing supporting bearings 28, 29 for the axis of rotation 30.

In all its forms of embodiment, the driving device according to the invention makes it possible to magnetize the corresponding parts of the movable member once the stator structure and the movable member are assembled. For magnetizing, the device can be placed in an inductor and the magnetization process is preferably effected at a temperature between 100 and 150° C.

The devices according to the invention can be used as linear actuators or as angular actuators with limited stroke for providing a practically constant torque over the stroke length, or they can be used as polyphase rotary motors. They are remarkable by their economic construction and their reliability. They make it possible, as discussed above, to obtain torque values which are comparable to those of the usual devices while ensuring correct operation at temperatures even substantially higher than 100° C. In practice, the dimensions of the magnetized part, which is made from an expensive material, can be adapted to the maximum ampere-turns and to the quality of the permeable material used in the magnetic circuit, and the coil or coils can be constructed in the most advantageous way within the same bulk, so as to dimension the whole device in an optimum way for a specific application.

I claim:

1. Electromagnetic driving device comprising a stator structure and a movable member including one or more parts magnetized perpendicularly to the direction of their movement, said magnetized part or parts being made from a material having a reversible permeability close to that of the air and having in the entire operating range a practically straight demagnetization characteristic and a straight recoil line practically coincident with this characteristic, said stator structure comprising at least one first magnetic circuit part made of a material of high magnetic permeability, said circuit part or parts having each two polar parts, said stator structure further comprising at least one electric energizing coil coupled with said first magnetic circuit part, the movable member or the stator structure comprising at least one second magnetic circuit part made of a material of high magnetic permeability and arranged so as to form with each of said polar parts an air-gap, all these air-gaps having the same substantially constant length measured perpendicularly to the faces of the polar parts, said first and second circuit parts forming together one or more closed magnetic circuits, the driving device being arranged so that said magnetized part or parts can move through said air-gaps, these magnetized parts having each a substantially constant length measured in the direction of magnetization, which length is shorter than the length of each air-gap by the mechanical clearance necessary to allow the movement of the movable member through said air-gaps, each magnetized part of the movable member having a width which does not exceed the sum of the width of a polar part and of the width of the space between the two polar parts of a same magnetic circuit, all these widths being measured in the direction of said movement, said magnetized parts of the movable member, in case said member comprises more than one of such parts, being all magnetized in the same direction, the material of the magnetized part or parts having a practically linear demagnetization characteristic up to temperatures at least equal to 100° C. and at least up to a negative value of the flux density substantially equal, in absolute value, to 0.5 times the remanence of said material, and said magnetic circuit or circuits and said magnetized part or parts being dimensioned so that the mean operating point of each magnetized part, in the absence of current in said coil or coils, lies at a flux density value smaller than 0.5 times the value of the remanence of said magnetic material.

2. Driving device according to claim 1, comprising a rotary movable member mounted on an axis which is lodged in the stator structure, said movable member having a limited stroke and comprising a magnetized part the shape of which is substantially that of a portion of a flat annular disc and which is arranged in a plane perpendicular to the axis of rotation of the movable member, said stator structure comprising at least one magnetic circuit part which is in the shape of a U the ends of which form polar parts, said polar parts having two respective edges opposite each other which are parallel to each other and parallel to an axial plane, the magnetized part having, in the direction of rotation, two end portions the edges of which substantially coincide, in the end positions of the movable member, with the respective edges of said polar parts.

3. Driving device according to claim 1, comprising a rotary movable member which is mounted on an axis lodged in the stator structure, said movable member comprising at least one magnetized part the shape of which is substantially that of a portion of a flat annular disc and which is arranged in a plane perpendicular to the axis of rotation of the movable member, said stator structure comprising at least two U-shaped magnetic circuit parts arranged at one side of the plane of the magnetized part, two neighbouring legs of said two U-shaped circuit parts being coupled with a same electric energizing coil, the ends of these neighbouring legs being joined by a common polar part.

4. Driving device according to claim 3, wherein said U-shaped circuit parts are formed of U-shaped sheet stacks.

5. Method of operating the driving device according to claim 1, wherein a biasing permanent current is applied to said coil or coils so as to adjust the mean operating point of said magnetized part or parts at a value of the flux density at least approximately equal to zero.

6. Method of manufacturing the device according to claim 1, comprising the steps of assembling said movable member in a non-magnetized state with said stator structure and thereupon placing the assembled device in an inductor for magnetizing said parts of the movable member.

7. Method according to claim 6, wherein, when magnetizing, the temperature is raised to a value comprised between 100 and 150° C.

* * * * *